ABSTRACT

United States Patent [19]

Inui et al.

[11] Patent Number: 4,868,355
[45] Date of Patent: Sep. 19, 1989

[54] STEERING WHEEL SEGMENTED SLIP RING AND CONTACT PIN ASSEMBLY

[75] Inventors: Shuji Inui; Chikahisa Hayashi; Mitsuhiro Kikuta; Satoshi Ono; Makoto Kawai; Yoshio Sano; Kunikazu Hirosawa; Makoto Kanai, all of Nishikasugai, Japan

[73] Assignee: Toyoda Gosei Co., Ltd., Nishikasugai, Japan

[21] Appl. No.: 213,272

[22] Filed: Jun. 29, 1988

[30] Foreign Application Priority Data

Jun. 30, 1987 [JP] Japan .................................. 62-101566
Jul. 27, 1987 [JP] Japan .................................. 62-187059
Aug. 7, 1987 [JP] Japan .................................. 62-121866
Aug. 8, 1987 [JP] Japan .................................. 62-121916

[51] Int. Cl.⁴ ...................... H01H 9/00; B60R 16/00; B62D 1/04
[52] U.S. Cl. .................................................. 200/61.54
[58] Field of Search ............... 200/11 R, 11 A, 11 G, 200/11 J, 11 K, 61.54, 61.56; 439/15-29

[56] References Cited

U.S. PATENT DOCUMENTS

| 3,030,460 | 4/1962 | Huetten et al. | 200/11 G |
| 3,771,096 | 11/1973 | Walter | 439/29 X |
| 3,794,784 | 2/1974 | Snider | 200/11 A |
| 3,939,313 | 2/1976 | Hayashi et al. | 200/11 J |
| 4,603,599 | 8/1986 | Matsuoka | 200/61.54 X |
| 4,616,224 | 10/1986 | Reighard | 340/825.69 |
| 4,633,731 | 1/1987 | Kurata | 200/61.54 X |
| 4,702,705 | 10/1987 | Hirano et al. | 439/15 |

FOREIGN PATENT DOCUMENTS 59-153643 9/1984 Japan .

Primary Examiner—J. R. Scott
Attorney, Agent, or Firm—Cushman, Darby & Cushman

[57] ABSTRACT

A steering wheel assembly including an insulated base having a surface; a plurality of segmented slip rings having surfaces, disposed separately on the insulated base along a circular line such that they are mutually insulated; a plurality of contact pins that make sliding contact with the segmented slip rings along the circular line, and are set facing the surfaces of the segmented slip rings; and interposing pieces provided between the adjacent segmented slip rings such that the contact pins can move smoothly across the segmented slip rings.

12 Claims, 16 Drawing Sheets

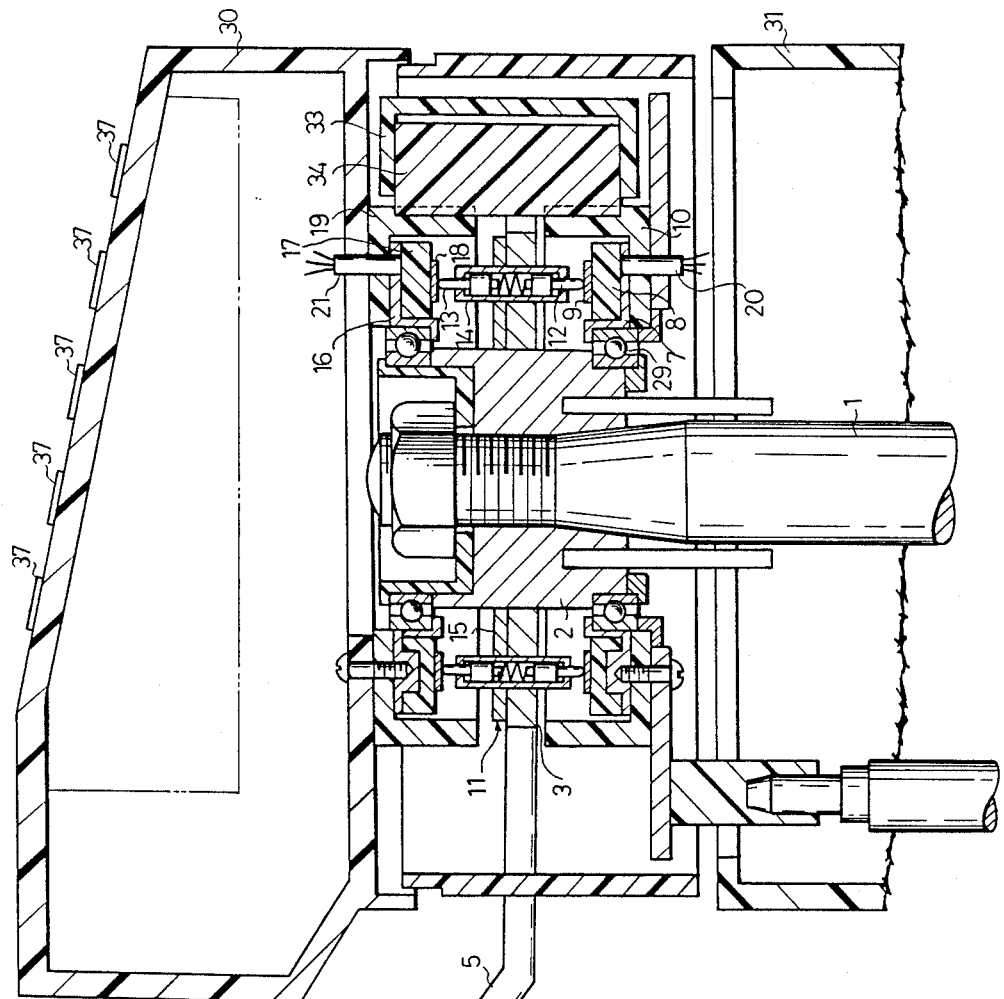
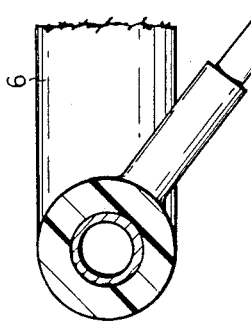
FIG. 2

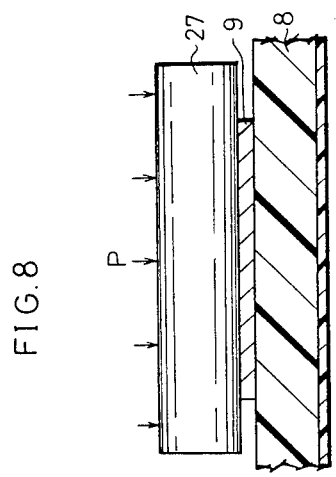
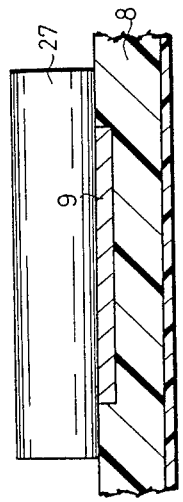
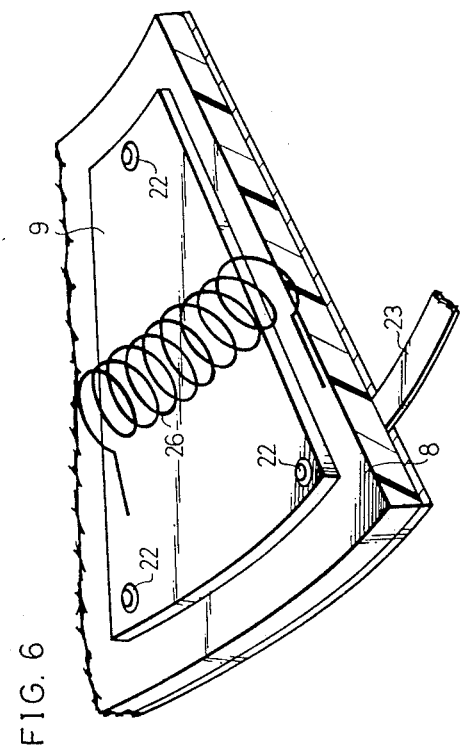
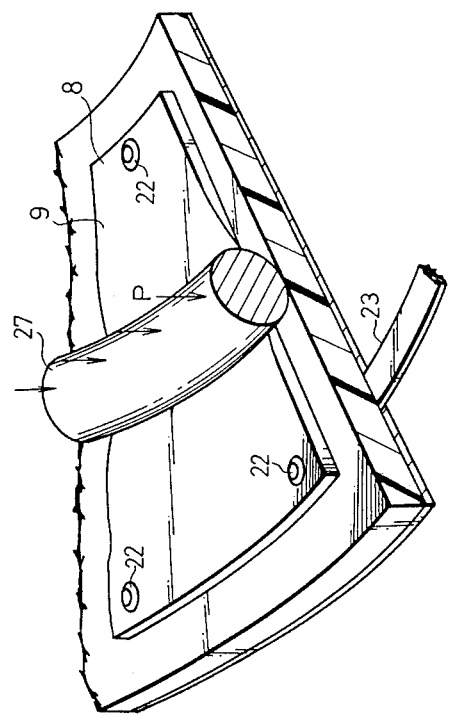

STEERING WHEEL SEGMENTED SLIP RING AND CONTACT PIN ASSEMBLY

BACKGROUND OF THE INVENTION

1. FIELD OF THE INVENTION

The present invention relates to a steering wheel, specifically, to a steering wheel furnished with a relay mechanism comprising slip rings and contact pins whose tips come in contact with the slip rings, to segmented slip rings for use in the steering wheel, and to a method of disposing the segmented slip rings.

2. DESCRIPTION OF THE RELATED ART

In recent years, audio equipment for vehicles, a computer for drive or the like tends to be assembled in a car. Also, switches for operating the computer for drive or the like are disposed on a pad portion of a steering wheel.

In this case, with reference to FIG. 39, there is provided, as a relay mechanism between the pad portion 916 of the steering wheel and a column portion 918, a multiplex transmission circuit utilizing an optical communication means in which a light emitting element is disposed on the pad portion 916 while a photo detector on the column portion 918.

In such a relay mechanism, as shown in FIG. 39, a pad portion 916 has provided thereon switches 930, a transmission side remote control IC 931, an electric signal-optical signal transducing circuit 932, and a power supply circuit 933. A signal relay portion 901 includes the above mentioned electric signal-optical signal transducing circuit 932, a light emitting circuit 934, a photo detector circuit 935, a signal regenerating circuit 936. A column portion 918 has disposed thereon a waveform shaping circuit 937, a receiving side remote control IC 938, an output interface 939, and a power supply circuit 940 having a battery. Further, a power relay portion 941 is provided between the pad portion 916 and the column portion 918.

By operating the switches 930 on the pad portion 916, the transmission side remote control IC 931, which is supplied with power from the power supply circuit 933, operates. Next, a plurality of electric signals are transduced into optical signals through the electric signal-optical signal transducing circuit 932. The light emitting circuit 934 emits light signals on the basis of the above light signals. At the same time, the photo detector circuit 935 receives the light signals, and the signal regenerating circuit 936 retransduces them into electric signals. Then, the waveform shaping circuit 937 shapes the electric signals into the original pulse waves. Thereafter, the same pulse waves are transmitted to the output interface 939 through the receiving side remote control IC 938 thereby to actuate electric devices or actuators.

However, the above relay mechanism needs the multiplex transmission circuit with a resultant complicated structure and high production cost.

SUMMARY OF THE INVENTION

An object of the present invention is to provide a segmented slip ring in which a momentary disconnection of a signal circuit and a generation of noise in a relay mechanism are eliminated when a contact pin moves between the slip rings.

An other object of the present invention is to provide a method of disposing the slip ring such that the slip ring and an insulated base are on a same plane, at least along a sliding contact line of the contact pins.

An other object of the present invention is to provide a steering wheel in which bouncing of the contact pins as they pass between the two slip rings is prevented, thus also preventing the momentary disconnection of the relay between the contact pin and the slip ring during a passage between the two segmented slip rings, and the generation of noise and non-uniform steering torque.

A further object of the present invention is to provide a steering wheel in which there is no momentary disconnection of the relay between a specific switch and a specific electrical device due to a vibration of the car body or other disturbance.

In order to realize the objects mentioned above, the present invention comprises a segmented slip ring disposed on an insulated base, comprising; a portion made substantially flush with a surface of said insulated base, and making in sliding contact with a contact pin.

Other objects of the present invention will become apparent with an understanding of the embodiments described later, and as clarified in the appended calims. Further, many advantages not mentioned in this specification will become obvious to one skilled in the art upon application of the present invention.

BRIEF DESCRIPTION OF THE DRAWINGS

FIG. 1 to FIG. 9 show a first embodiment of the present invention,

FIG. 1 is an exploded perspective view showing an entire steering wheel,

FIG. 2 is a sectional view showing the same,

FIG. 3 is a circuit diagram showing a signal circuit,

FIG. 4 is an enlarged perspective view, partly in section, showing an insulated base, FIG. 5 is a partially broken perspective view showing the entire insulated base, FIG. 6 is a partially broken perspective view showing a slip ring and heating means, FIG. 7 is a partially broken perspective view showing the slip ring and the pressing means, FIG. 8 is a partial sectional view showing the state immediately before a leveling process, FIG. 9 is a partial sectional view showing a state immediately after the leveling process, FIG. 26 is a plan view showing an arrangement of contact pins on slip rings, FIG. 27 is a plan view showing a contact pin unit, FIG. 28 is a circuit diagram showing signal circuits, FIG. 30 is an exploded perspective view showing a sun gear and connector, FIG. 31 is a partial perspective view showing an insulated base, FIG. 32 is a partial sectional view showing the connector, FIG. 35 is an exploded perspective view showing a contact pin unit, FIG. 36 is a partial sectional view of the same.

DESCRIPTION OF THE PREFERRED EMBODIMENT

A first embodiment of the present invention is described with reference to FIG. 1 to FIG. 9.

Figure 1:
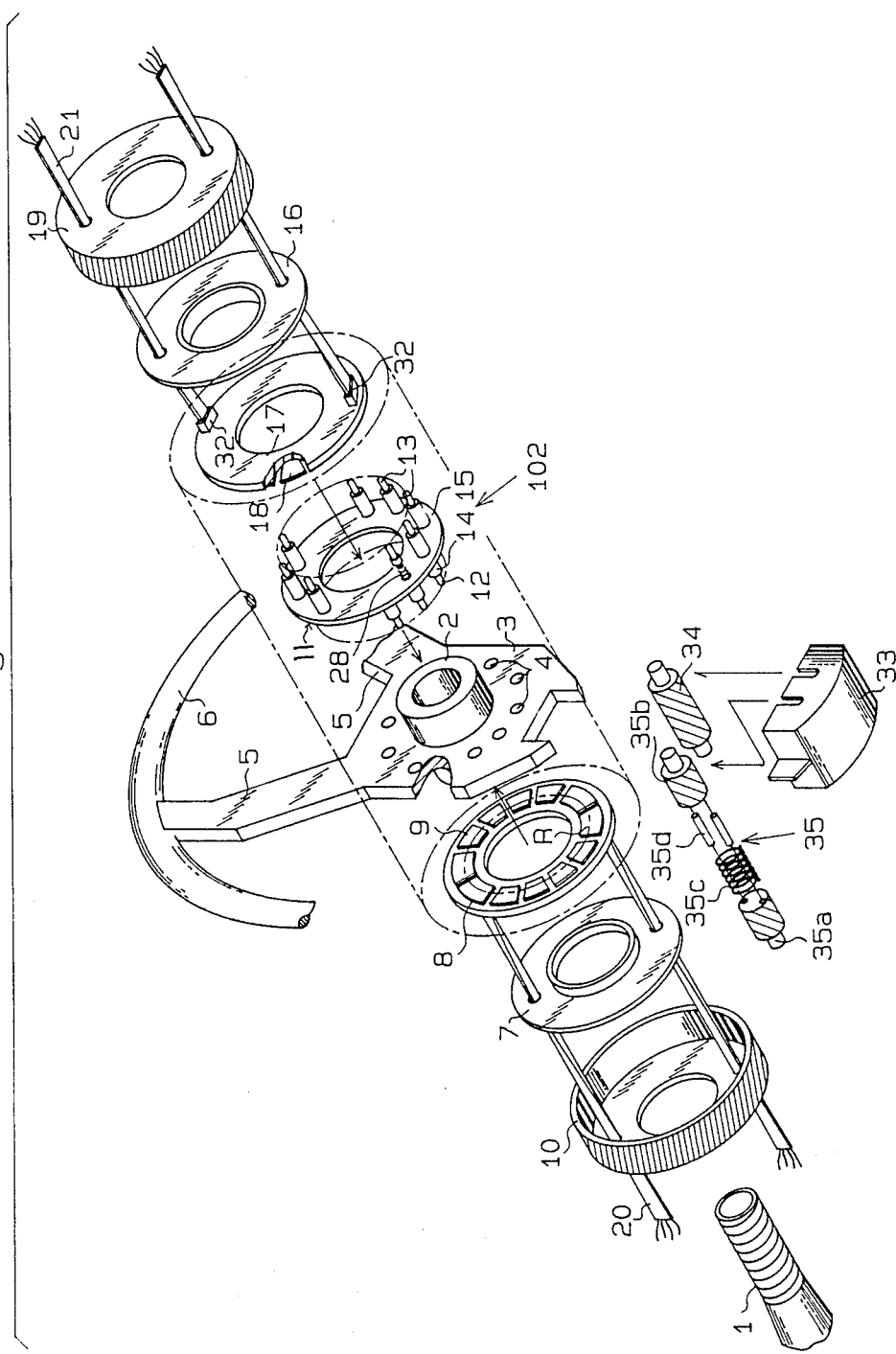
Figure 3:
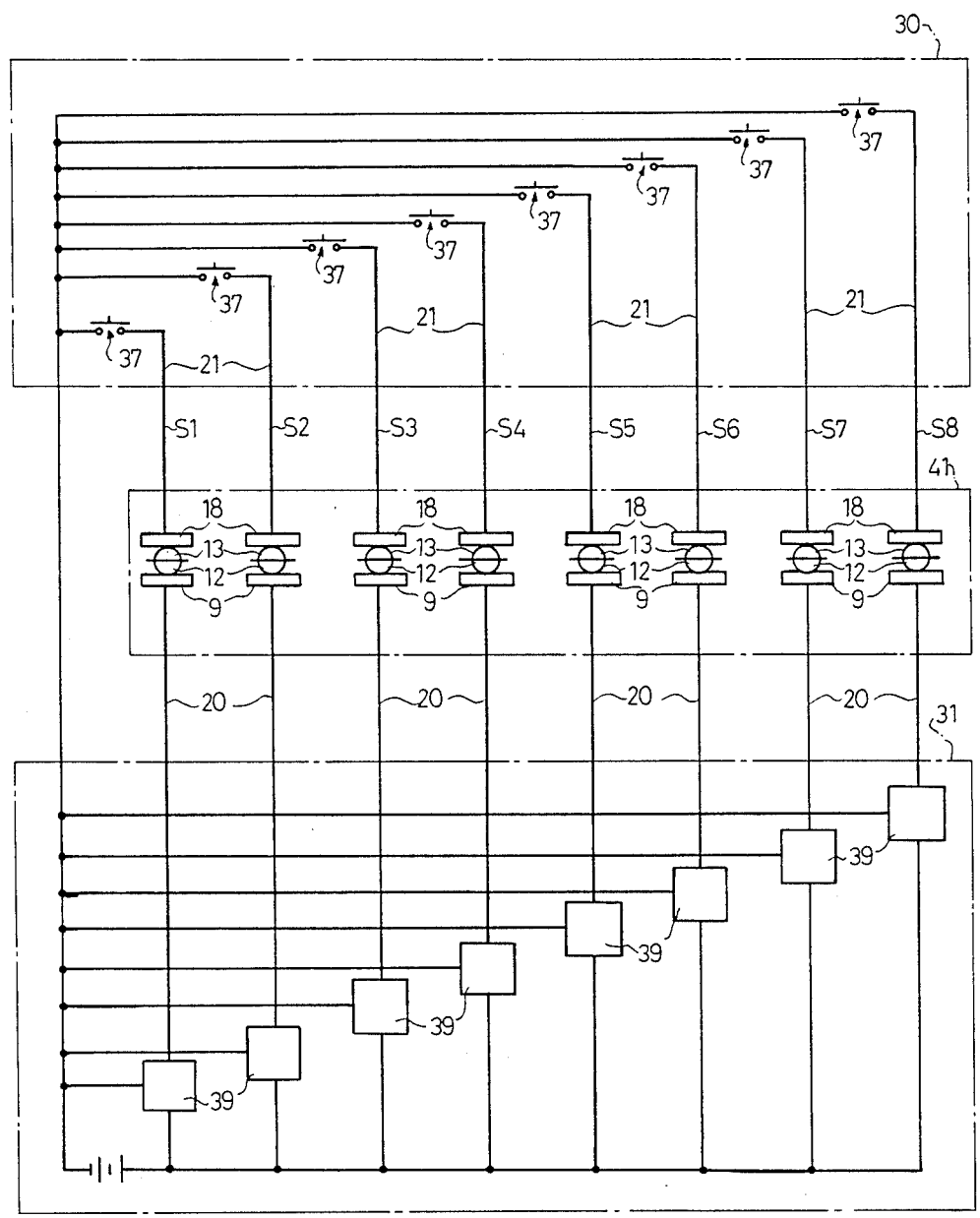

As shown in FIG. 1 and FIG. 2, a boss plate 3 extends outward from a boss portion 2 fixed to an end of a steering shaft 1. A plurality of locking holes 4 for inserting contact pin holders, to be mentioned later, are perforated on this boss plate 3. A ring portion 6 is supported at the ends of a pair of spokes 5 extending from the boss plate 3.

A column bearing plate 7 is fitted to the lower part of the boss portion 2 with bearings 29 in between. Column segmented slip ring 9 are disposed on an insulated base 8 having the shape of a flat doughnut, and are fixed to the column bearing plate 7 through this insulated base 8.

A column sun gear 10 below the column bearing plate 7 is fixed to or engaged with a column portion 31, and it is always kept at an irrotational state.

On the other hand, a contact pin unit 11 is provided above the boss portion 2, comprising column contact pins. 12 and pad contact pins 13, that constitute pairs with a coil spring 28 between each pair, contact pin holders 14 for holding the pairs of contact pins 12, 13, and a contact pin mounting piece 15 having the shape of a flat doughnut, for holding the contact pin holders 14 such that the tips of the column and pad contact pins 12, 13 are situated on the same planes, respectively.

A pad bearing plate 16 is fitted to the upper part of the boss portion 2. Twelve pad segmented slip rings 18 are disposed in the shape of a ring on an insulated base 17 on the lower surface of the pad bearing plate 16, such that each of the slip rings 18 is facing each of the column segmented slip rings 9.

A pad sun gear 19 is fixed to the upper surface of the pad bearing plate 16. Further, two lead wires 20 extend from the insulated base 8 to the column portion 31, and are connected to an electrical device, actuator 39, and others, provided in a car body. Similarly, two lead wires 21 extend from the insulated base 17 to a pad portion 30, and are connected to various switches 37. The electrical device 39 and others mentioned above are operated or induced to stop operating by turning these switches 37 on or off. Thus, in this embodiment, twelve signal circuits are formed between the electrical device 39, and others, and the switches 37. In each signal circuit, a relay mechanism 41 is formed, comprising the circuit: column segmented slip ring 9—column contact pin 12—coil spring 28—pad contact pin 13—pad sengmented slip ring 18.

By means of this structure, when the switches 37 provided on the pad portion 30 is turned on or off, the electrical device, atcuator 39 and others provided on the car body are operated and stopped operating via the relay mechanism 41.

Two planetary gears 34, 35 are attached to the boss plate 3 by means of a bearing 33. One planetary gear 35 is composed of two gear segments 35a, 35b. Between these two gear segments 35a, 35b, there are two coupling pieces 35d, that serve to regulate the two gear segments 35a, 35b from rotating relative to each other, and a coil spring 35c that acts to push the two gear segments 35a, 35b apart.

Figure 4:
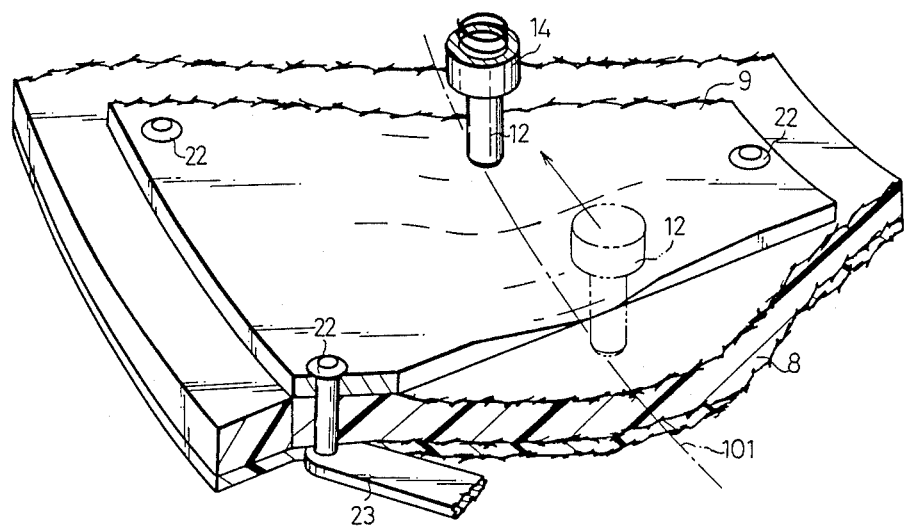
Figure 5:
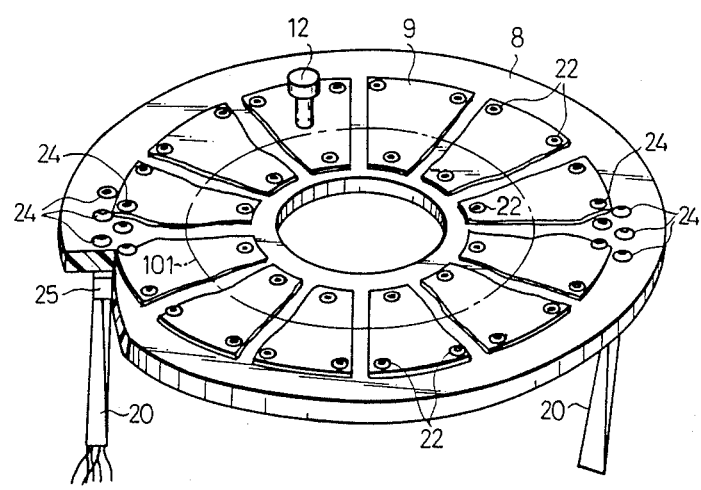

As shown in FIG. 4 and FIG. 5, the twelve column segmented slip rings 9, each shaped like a fan, are mounted in the shape of a ring on the insulated base 8 having the shape of a flat doughnut, forming a circular sliding contact line 101.

The outer circumferential edge and inner circumferential edge of each column segmented slip ring 9 are fixed to the insulated base 8 by means of mounting through holes 22.

Further, in each of the column segmented slip rings 9, the region on and near the circular sliding contact line 101 is on the same plane as or made flush with the insulated base 8. Also, conductive patterns 23 are provided on the back side of the insulated base 8. One end of each pattern 23 is electrically connected to one mounting through hole 22 of each of the column segmented slip rings 9 while the other ends are connected to wire connecting through holes 24 concentrated at two locations on the insulated base 8. Some of the mounting through holes 22 are also used as wire connecting through holes 24 as shown in FIG. 5. Pins (not shown) of a connector 25 of the lead wire 20 are connected to the wire connecting holes 24 at the back side of the insulated base 8.

The pad segmented slip rings 18 essentially have the same construction as the column segmented slip rings 9.

Next, a method of manufacturing the slip rings 9, 18 mentioned above is described. Inasmuch as the parts related to the column portion 31 and pad portion 30 are the same, only the parts related to the column portion 31 are shown in the figures.

As shown in FIG. 6, a plurality of the segmented slip rings 9 are disposed by a subtractive method and others at fixed intervals in the shape of a ring on one surface of the insulated base 8 made of synthetic resin such as epoxy resin, and others. Also, the conductive patterns 23 for electrically connecting the column segmented slip rings 9 and the lead wires 20, 21 are formed on the other surface of the insulated base 8 (mounting process).

Next, perforations for forming the mounting through holes 22 and wire connecting through holes 24 are provided at fixed locations on the insulated base 8. The holes 22, 24 are then formed by electroless plating.

Next, the synthetic resin material of the insulated base 8 and the segmented slip rings 9 in the vicinity of the circular sliding contact line 101, on which the column contact pins 12, to be described later, make sliding contact while moving, are heated with heating means 26 until it becomes soft. Then, as shown in FIG. 7, the heated portion of the segmented slip ring 9 is pressed against the insulated base 8 with pressing means 27 by thermal pressing (leveling process).

Here, thermal pressing means making the synthetic resin making up the insulated base 8 soft by heating, and pressing the column segmented slip rings 9 against the synthetic resin at a fixed pressure P, embedding the column segmented slip rings 9 into the insulated base 8.

The pressing means 27 used in the leveling process has a length and breadth such that it projects at least a little from the boundaries of the column segmented slip ring 9, at the part where it is to be leveled with the insulated base 8.

The pad segmented slip ring 18 is also disposed according to the processes mentioned above.

Next, the operation of the present embodiment is described and its effects are mentioned. When the column or pad segmented slip ring 9, 18 is pressed with the pressing means 27 against the area of the insulated base 8, 17 which has been heated and is to be made level with the column or pad segmented slip ring 9, 18, as shown in FIG. 8, the column or pad segmented slip ring 9, 18 is embedded into the insulated base 8, 17, as shown in FIG. 9. As a result, the synthetic resin making up the insulated base 8, 17 is displaced by the column or pad segmented slip ring 9, 18 and forced out of the space occupied by the segmented slip ring 9, 18.

Since the pressing means 17 is formed long enough such that it projects from the boundaries of the column or pad segmented slip ring 9, 18, and covers a portion of the insulated base 8, 17, after having pressed the segmented slip ring 9, 18, a fixed amount, at a certain pressing force P, the pressing means 27 encounters the resistance of the displaced synthetic resin, and will no longer be able to press the column or pad segmented slip rings 9, 18 any further. If the thermal pressing stage is halted at this point, the column or pad segmented slip ring 9, 18 will become attached to the insulated base 8, 17, and, at the same time, be on the same plane as the insulated base 8, 17.

In the present embodiment, since the column and pad segmented slip rings 9, 18 do not undergo thermal pressing entirely, that is, only the regions away from the mounting holes 22 and wire connecting holes 24 undergo thermal pressing, these holes 22, 24 do not undergo any deformation. Therefore, the locking capabilities of the column and pad segmented slip rings 9, 18 with the insulated bases 8, 17 are maintained.

The steering wheel having the structure described above is attached to the steering shaft of a car body. In the steering operation, when the switch 37 on the pad portion 30 is turned on or off, the contact pin unit 11 rotates with the boss plate 3 and the column and pad contact pins 12, 13 make sliding contact with the column and pad segmented slip rings 9, 18, respectively, along the circular sliding contact line 101. Since the column and pad segmented slip rings 9, 18 are very accurately situated on the same plane as those of the insulated bases 8, 17, when the column and pad contact pins 12, 13 pass through the slip rings 9, 18, there is no momentary disconnection of the signal circuit, and noise in the relay mechanism 41 is not generated. In addition, the operating torque is uniform. Hence, compared to the related art, the quality of the steering wheel of the present embodiment is remarkably improved.

The present embodiment can also be concretized with the following modifications.

(1) The column and pad segmented slip rings 9, 18 can undergo thermal pressing on the insulated bases 8, 17 not only on the parts corresponding to the circular sliding contact line 101 but entirely, that is, as a whole.

Figure 10:
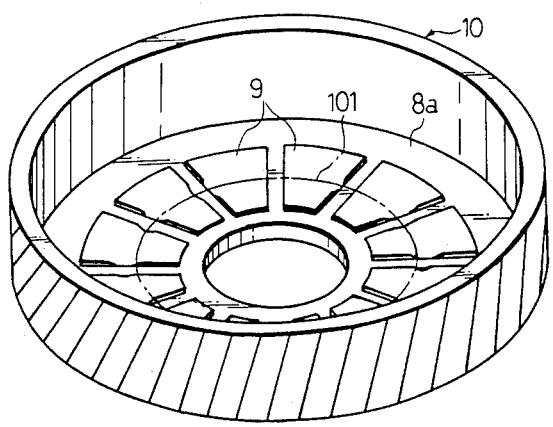
FIG. 10 is a perspective view showing a modification of the first embodiment.

(2) As shown in FIG. 10, the column and pad segmented slip rings 9, 18 can be mounted on a wheel portion 8a of the column and pad sun gears 10, 19, which can serve as insulated bases, and the part corresponding to the circular sliding contact line 101 can be made to be on the same plane as that of the wheel portion 8a.

In this modification, the column and pad segmented slip rings 9, 18 can be disposed on the wheel portion 8a according to the following methods.

Figure 11:
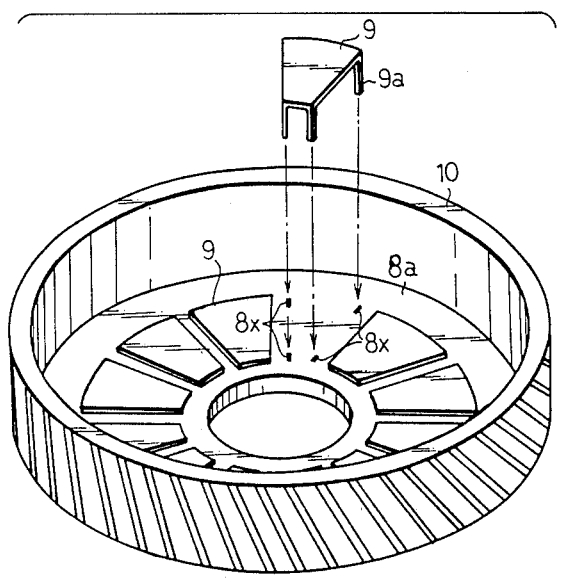
FIG. 11 is an exploded perspective view showing a process of disposing the slip ring of FIG. 10.

A first method is as shown in FIG. 11. This method involves integrally forming leg portions 9a at the corners of the lower surface of each of the column and pad segmented slip rings 9, 18 made of phosphor bronze, and inserting these leg portions 9a into mounting holes 8x provided on the wheel portion 8a. The leg portions 9a inserted into the mounting holes 8x are attached to the wheel portion 8a by slodering them to the through holes of the printed circuit board (not shown) provided on the back side of the wheel portion 8a.

Figure 13:
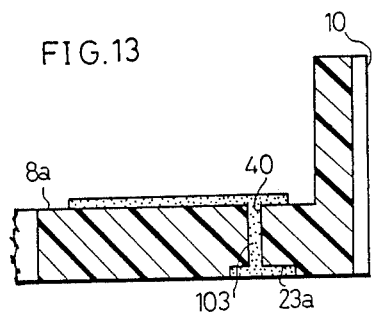
FIG. 13 to FIG. 15 are partial sectional views showing the process of disposing the slip ring of FIG. 12.
Figure 14:
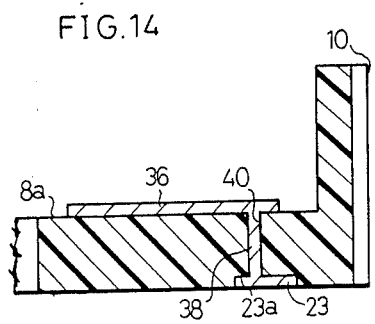

A second method is as shown in FIG. 13. This method involves setting a catalyst 103 by screen printing, letterpress, or other methods on the parts where the column and pad segmented slip rings 9, 18 are to be disposed, on recessed portions 23a where the conductive patterns 23 are to be formed, and on perforations 40 connecting them. Then, electroless plating with copper is performed, forming a highly conductive ground layer 36, conductive patterns 23, and a connecting portion 38 connecting them, as shown in FIG. 14.

Figure 15:
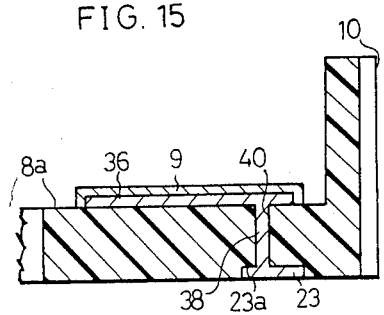

In this method, as shown in FIG. 15, the column and pad segmented slip rings 9, 18 are formed by performing electrolytic plating or electroless plating with Ni-B, or other hard metals, at locations on the wheel portions 8a corresponding to the conductive patterns 23, where these slip rings 9, 18 are to be formed.

Figure 12:
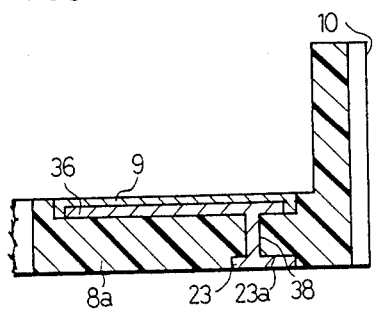
FIG. 12 is a partial sectional view showing another modification.

Then, lastly, the wheel portions 8a are heated, and the column and pad segmented slip rings 9, 18 are made to be at the same plane as those of the wheel portions 8a, as shown in FIG. 12, by thermal pressing.

In this modification, the conductive patterns 23 on the back side of the wheel portions 8a are formed on the recessed portions 23a. In the thermal pressing stage of the column and pad slip rings 9, 18, the connecting portions 38 are prevented from being destroyed by the presence of these recessed portions 23a.

(3) The main material used as synthetic resin is thermoplastic resin, but a thermosetting synthetic resin with weak crosslinks can be used, and then made to harden in a later process.

(4) As methods of softening the synthetic resin, there are the external heating methods using hot blast, hot plate, flame, and others, and internal heating methods using high frequency waves, supersonic waves, and others.

(5) In the mounting porcess, first, recessed portions having approximately the same shape as the plane figures of the column and pad segmented slip rings 9, 18, and depth slightly shallower than the thickness of the slip rings 9, 18 are formed on the insulated bases 8, 17, and then the planes are made even after the column and pad segmented slip rings 9, 18 are set in these recessed portions.

(6) This method in the present invention can also be applied as a method of disposing any type of segmented slip ring on an insulated base, other than the segmented slip ring used in the relay mechanism 41 of a steering wheel.

The second embodiment of the present invention is described with reference to FIG. 16 and FIG. 17. The present embodiment differs from the first embodiment in the structure of the slip ring area.

Figure 16:
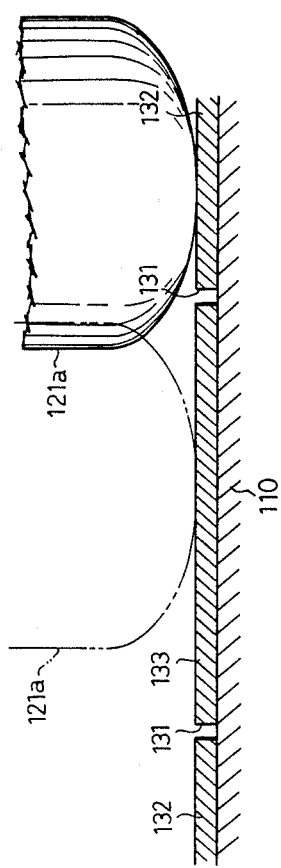
FIG. 16 is a partial sectional view showing a dummy contact point of a second embodiment.
Figure 17:
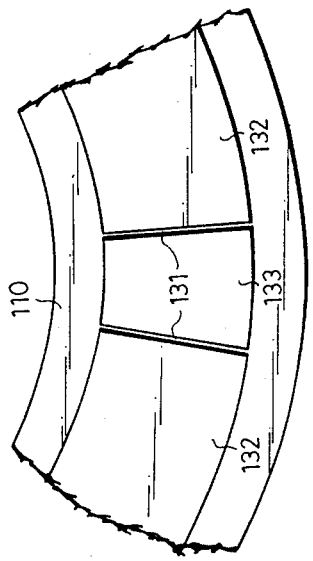
FIG. 17 is a plan view of the same.

As shown in FIG. 16 and FIG. 17, a dummy contact point 133 is provided as interposing means between two segmented slip rings 132 disposed on a column insulated base 110. In addition, a gap is provided between the dummy contact point 133 and the segmented slip ring 132 each gap being insulated groove 131 having a narrow width.

The dummy contact point 133 is formed of the same material as the slip ring 132 are with the same height, and the upper surfaces of both 133, 132 and with the same height, and the upper surfaces of both 133, 132 are on the same plane. Further, the arc length of the dummy contact point 133 is slightly longer than the diameter of contact pins 121a.

The lead wires 20 are connected to each segmented slip ring 132, and the lead wire 20 extend to the column portion 31 and are connected to the electrical device, actuator 39, or others, provided in the car. On the other hand, the dummy contact points 133 are not electrically connected to anything and are completely insulated.

Similarly, the same dummy contact points are also provided in the pad portion 30. Further, the lead wires 21 connected to the slip rings of the pad portion 30 are connected to the switches 37 provided on the pad portion 30. On the other hand, the dummy contact points on this pad portion 30, like those of the column portion 31, are also not electrically connected to anything, and are completely insulated.

As a method of forming the dummy contact points 133, for example, they can be formed by a plating process simultaneously done with the plating process for forming the slip ring 132. In this case, a part without plating can be formed between the dummy contact points 133 and the segmented slip rings to serve as an insulating groove 131, insulating them 133, 132 from each other.

Next, the effect of the slip ring 131 during the operation of the steering wheel constructed as above is described.

As shown by the solid line in FIG. 16, while the contact pin 121a is making sliding contact with the slip ring 132, a relay mechanism is formed due to this contact pin 121a, comprising the circuit: column slip ring 132—column contact pin 121a—coil spring—pad contact pin—pad slip ring.

As shown by the two-dot chain line in FIG. 16, when the contact pin 121a passes through the insulating groove 131 and moves to the dummy contact point 133 due to the steering operation, the relay mechanism ceases to operate. That is, even if the dummy contact point 133 itself is of the same conductive material as the slip rings 132, this dummy contact point 133 is insulated from the slip rings 132 on both sides by the insulated groove 131, and is not electrically connected to anything.

As the contact pin 121a moves further, it comes in contact with another segmented slip ring 132, and including the slip ring 132 and the contact pin 121a, the relay mechanism is again formed, comprising the circuit: column slip ring 132—column contact pin 121a—coil spring—pad contact pin—pad slip ring.

The slip ring 132 and dummy contact points 133 of the steering wheel of the present embodiment can be provided by etching only the parts corresponding to the insulating grooves 131, from a ring-shaped conductor having a plane surface. Thus, the heights of the dummy contacts points 132 and those of the slip rings 133 will always be of the same level.

Therefore, there is no generation of noise and non-uniform steering torque, or bouncing of the contact pins 121a and consequent momentary disconnection as they pass through the insulating groove 131, as a result of the differences in the heights of the slip ring 132 and the dummy contact points 133, or the presence of the insulating grooves 131.

A modification of the present embodiment is described next.

Figure 18:
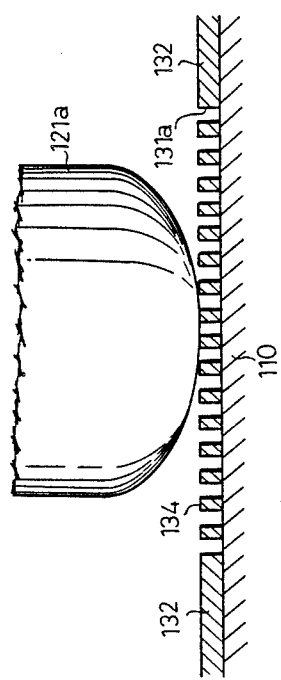
FIG. 18 is a partial sectional view showing a modification of the second embodiment.
Figure 19:
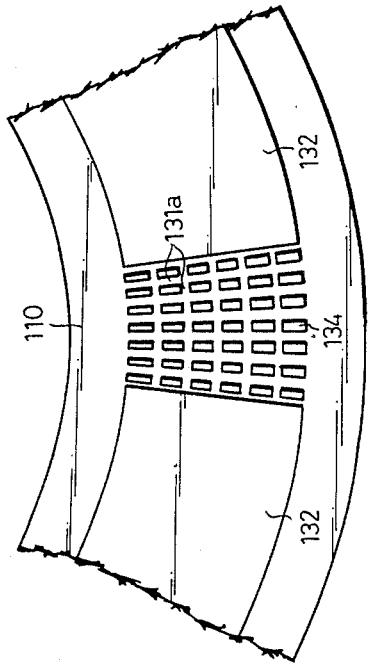
FIG. 19 is a plan view of the same.

In the second embodiment, each dummy contact point 133 was formed as one unit. As opposed to this, dummy contact points 134 as interposing means in the modification is divided into a plurality of small segments by insulating grooves 131a along the circumferential and radial directions of the insulated base 110, as shown in FIG. 18 and FIG. 19. In addition, the width of each insulating groove 131a is, like those of the insulating groove 131 in the first embodiment, very narrow.

Thus, in the modification described above, if by chance a foreign conductive substance is stuck inside an insulating groove 131a, since the other insulating grooves 131a that are free from the foreign conductive substance still do not lose their insulating effect, the intrinsic relay capability is not lost.

Next, a third embodiment of the present invention is described with reference to FIG. 20 to FIG. 23. The present embodiment, like the second embodiment, differs from the first embodiment in the structure of the slip ring area.

Figure 20:
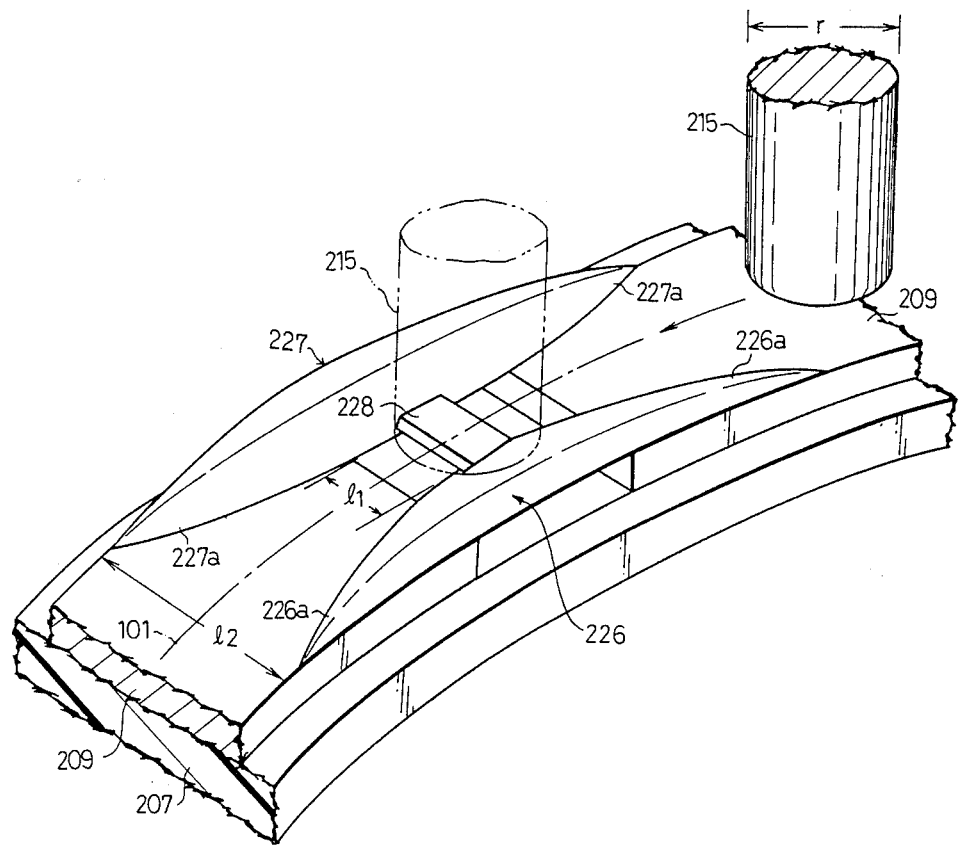
FIG. 20 is a partial sectional view showing guiding pieces of a third embodiment.
Figure 21:
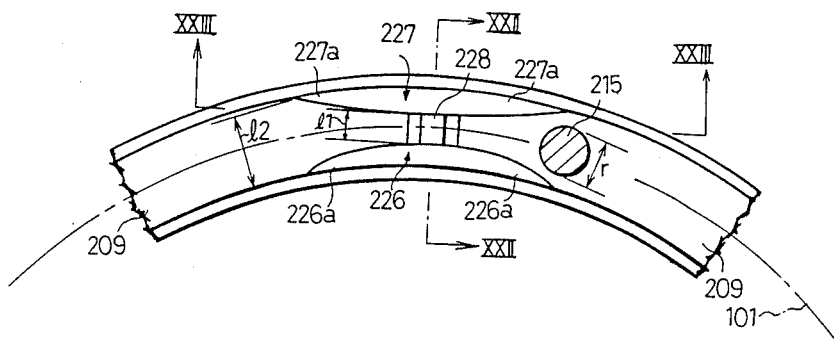
FIG. 21 is a partial plan view of the same.

As shown in FIG. 20 and FIG. 21, a plurality of fan-like segmented slip rings 209 are disposed at mutually separate locations on the surface of an insulated base 207 having the shape of a flat doughnut, attached below the boss plate 3.

Figure 22:
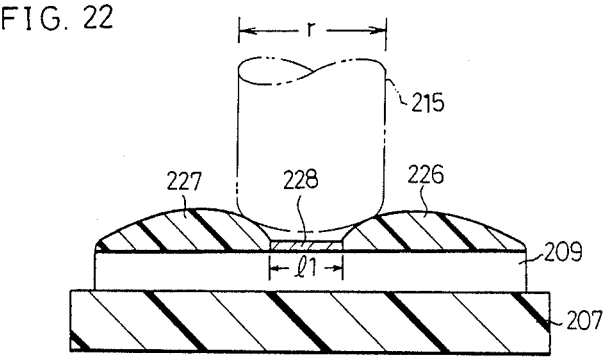
FIG. 22 is a sectional view along the line XXII—XXII in FIG. 21.
Figure 23:
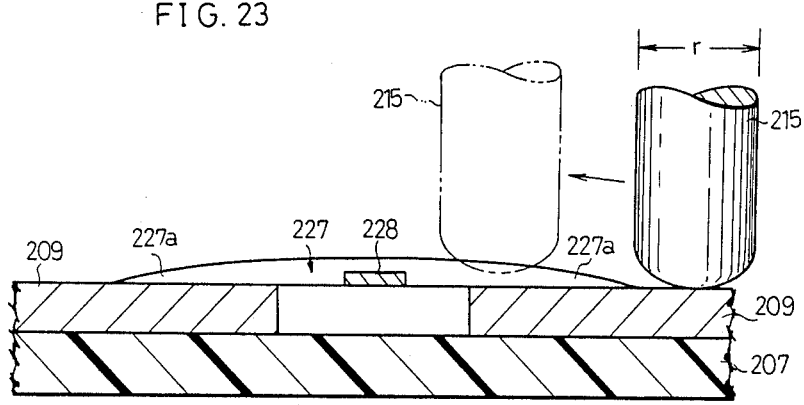
FIG. 23 is a sectional view along the line XXIII—XXIII in FIG. 21.

A pair of guiding pieces 226, 227 as interposing means is attached by means of an adhesive, or others, to the outer and inner sides of the circular sliding contact line 101 on a pair of adjacent segmented slip rings 209, spanning both segmented slip rings 209. The upper surface of each pair of guiding pieces 226, 227 are formed in a curving convex shape, with the upper surfaces of the curving end portions, making up inclined portions 226a, 227a, smoothly continuing and connecting with the upper surface of the segmented slip ring 209. Further, as shown in FIG. 22, the inner surfaces of each of the guiding pieces 226, 227 are curvely formed such that the interval between them becomes narrower toward the lower portion. The interval $l_1$, between the lower edges of the mutually opposing inner surfaces of the pair of guiding pieces 226, 227 between two adjacent segmented slip rings 209, is set narrower than the diameter r of the tip of the contact pin 215. The interval $l_2$ between the end portions of the pair of guiding pieces 226, 227 is set wider than the diameter r of the tip of the contact pin 215.

A connecting piece 228 is interposed between the lower portion of the inner surfaces of the pair of guiding pieces 226, 227 disposed between the segmented slip rings 209, connecting the guiding pieces 226, 227 at the central portion of their lengths.

The pad segmented slip ring also has the same structure described above.

Next, the operation of the present embodiment constructed as described above is explained, and its effects are mentioned.

When the ring portion 6 is rotated during the steering operation, the contact pin 215, while moving, makes sliding contact with the segmented slip ring 209 along the circular sliding contact line 101. During this process, when the contact pin 215 moves form one segmented slip ring 209 to another adjacent to the same, the tip of the same contact pin 215, working against the force of the coil spring, smoothly ascends along the inclined portions 226a, 227a at the end portions of the guiding pieces 226, 227. This contact pin 215 moves further, and when it reaches approximately the central portion of the guiding pieces 226, 227, the contact pin 215 becomes situated above the space between the end of two segmented slip rings 209. Because of this, the contact pin 215 is completely disconnected from the segmented slip ring 209. The contact pin 215 moves further, and after smoothly descending along the inclined portions 226a, 227a at the end portions of the guiding pieces 226, 227, it reaches the adjacent segmented slip ring 209. Thus, the contact pin 215 can travel smoothly between the segmented slip ring 209 without making simultaneous contact with the end portions of a pair of adjacent segmented slip rings 209.

The effect mentioned above is also exhibited with respect to the pad segmented slip ring and contact pin.

As described above, in the steering wheel equipped with the relay mechanism of the present embodiment, when the contact pin 215 moves between the segmented slip rings 209, as opposed to the steering wheel in the related art, there is no jumping up of the contact pin 215 as a result of impact between the segmented slip rings 209, or at stepped regions 201. The contact pins 215 become capable of smooth movement, and not only are the momentary electrical disconnection between the contact pins 215 and the slip rings 209, and the generation of noise and unwanted sound prevented, but also, the non-uniformity of the load in the steering operation is lessened.

Figure 24:
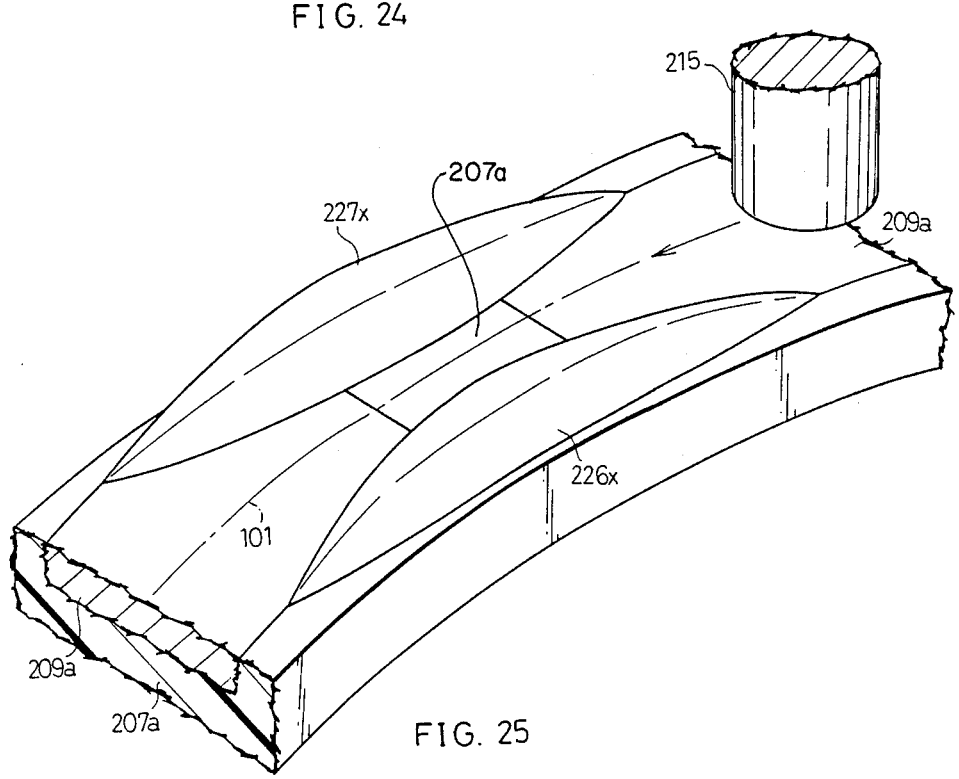
FIG. 24 is a partial perspective view showing a modification of the third embodiment.
Figure 25:
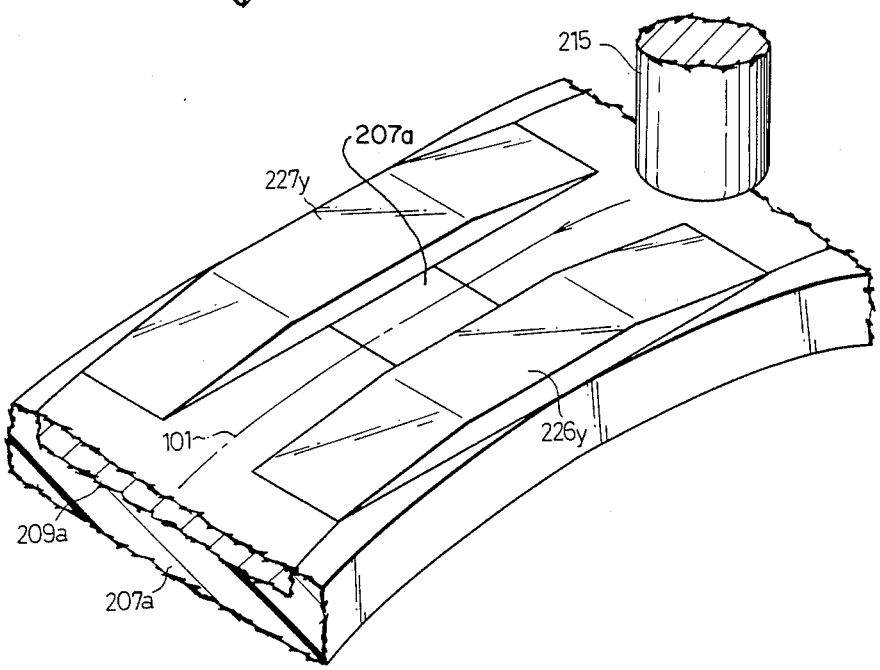
FIG. 25 is a partial perspective view showing another modification of the third embodiment.

The present embodiment can be modified, for example, by embedding segmented slip rings 209a into an insulated base 207a, as shown in FIG. 24, and forming guiding pieces 226x, 227x as interposing means integrally with the insulated base 207a. Further, as shown in FIG. 25, guiding pieces 226y, 227y as interposing means can be formed such that the interval between their inner surfaces is constant everywhere along the circular direction.

Next, a fourth embodiment of the present invention is described with reference to FIG. 26 to FIG. 28.

Figure 26:
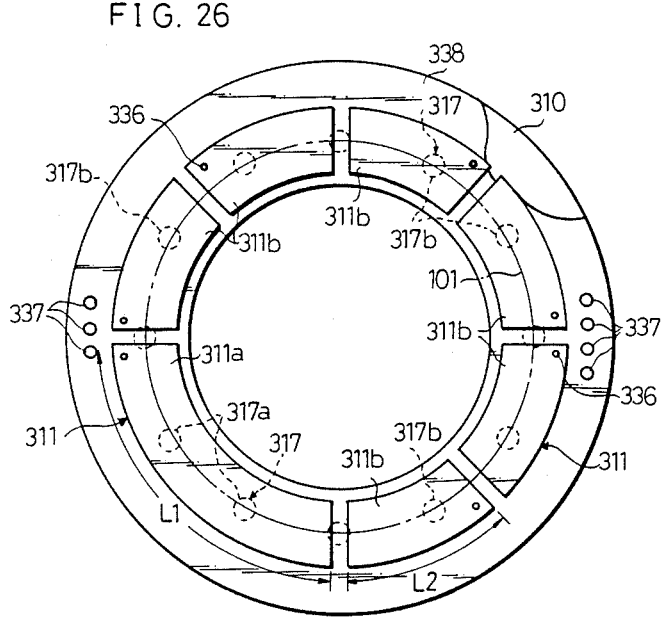
FIG. 26 to FIG. 28 show a fourth embodiment.

As shown in FIG. 26, seven fan-like segmented slip rings 311 are disposed along the circular sliding contact line 101 on an insulated base 310 having the shape of a flat doughnut, situated below the boss plate, that is, in the column portion.

The segmented slip rings 311 are electrically connected to wire connecting portions 337 by means of through holes 336 and wiring patterns (not shown) formed on the back side of the insulated base 310, and are designed to act as a relay for seven signal circuits to be described later. The area of the insulated base 310 around the segmented slip rings 311 is covered with a green resist layer 338 serving as an insulating layer.

Further, in this embodiment, one 311a of the seven segmented slip rings 311 is formed with an arc length L1 approximately twice the arc length of the others 311b. This slip ring 311a is always in sliding contact with a number of contact pins, as described later. In this sense, in the present embodiment, the slip ring 311a with a long arc length L1 will be called multiple-contact slip ring and the other slip rings 311b will be called single-contact slip rings.

Above the boss plate, that is, in the pad portion, the structure of the slip rings 318 disposed on the insulated base is the same as that of the slip rings in the column portion. The insulated bases 310 are arranged such that a corresponding multiple-contact slip ring 318a of the pad portion and the multiple-contact slip ring 311a of the column portion are facing each other.

Figure 27:
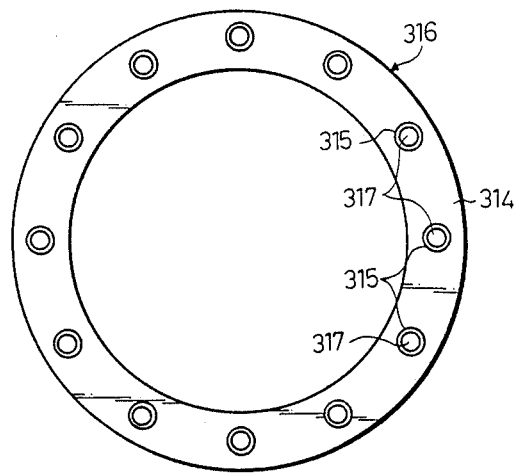

On the other hand, in order to electrically connect together the corresponding pair of multiple-contact slip rings 311a, 318a, and the six pairs of single-contact slip rings 311b, 318b, twelve sets of contact pins 317, 327, each set comprising a pair of an upper and lower pins, are held in contact pin holders 315, as shown in FIG. 27 disposed at equal intervals on a contact pin support plate 314, in the form of a circle, as in the first embodiment. Thus, as shown in FIG. 24, in the steering operation, even if some of the pad contact pins 317 are situated on the green resist layer 338 between the adjacent segmented slip rings 311, the rest of the contact pins 317 are always in sliding contact with the segmented slip rings 311, and at least a number of contact pins 317a are in sliding contact with the multiple-contact slip ring 311a. In this embodiment, the contact pins 317a are referred to as multiple-contact contact pins. In the same manner, a number of contact pins 327a among the pad contact pins 327 that make sliding contact with the multiple-contact slip ring 318 also function as multiple-contact contact pins.

Figure 28:
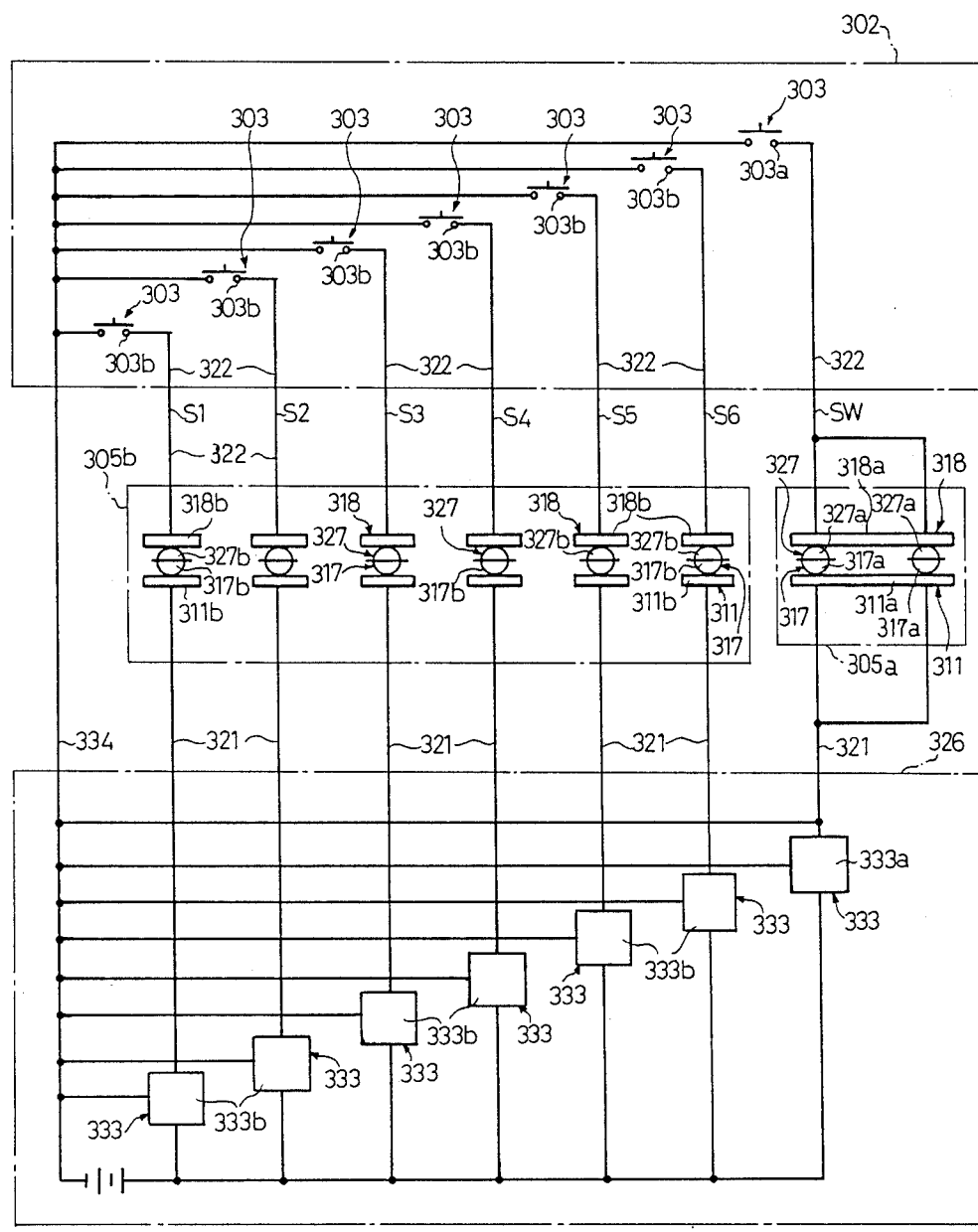

As shown in FIG. 28, one assemblage of a multiple-contact relay mechanism 305a comprising the circuit: multiple-contact slip ring 311a—a number of pairs of multiple-contact contact pins 317a—multiple-contact slip ring 318a, is connected to a horn relay 333a, as a specific electrical device, through a signal line 321, as well as to a horn switch 303a as a specific switch by means of a signal line 322. The horn relay 333a and horn switch 303a are further connected by a common line 334, thus forming a multiple-contact signal circuit Sw of the present embodiment. Since the steering shaft 1 can be used as the common line 334, there is no need of using a specific relaying means.

Similarly, six assemblages of single-contact relay mechanisms 305b comprising the circuit: single-contact slip ring 311b—single-contact contact pin 317b—single-contact slip ring 318b, are connected through the signal lines 321 to conventional electrical devices 333b such as air conditioner, audio device, and others that are not greatly affected by momentary disconnection, as well as to conventional switches 303b by means of the signal lines 322. The conventional electrical devices 333b and switches 303b are further connected by means of the common line 334, thus forming six single-contact signal circuits S1–S6 of the present embodiment.

Next, the operation of the present embodiment is described, and its effects are mentioned. First, in the process of assembling the steering wheel, when assembling the planetary gear mechanism, the insulated base 310 is fixed to the planetary gear mechanism after adjusting the position of rotation of the insulated base 310. This adjustment is done such that the multiple-contact slip ring 311a of the segmented slip rings 311 below the boss plate and the multiple-contact slip ring 318a of the segmented slip rings 318 above the boss plate are set facing each other.

Then, after the assembly of the steering wheel according to known procedures has been completed, the multiple-contact signal circuit Sw is formed by connecting the signal line 321 of the multiple-contact slip ring 311a to a specific electrical device 333a, and the signal line 322 of the multiple-contact slip ring 318a to a specific switch 303a. The single-contact signal circuits S1–S6 are also formed according to the same procedure employed in forming the multiple-contact signal circuit Sw.

When the steering wheel assembled as described above is mounted on a car and operated, a contact pin unit 316 fixed to the boss plate 3 rotates with the ring portion 6. But since the insulated base 310 does not rotate, the contact pins 317, 327 revolve between the segmented slip rings 311, 318 and make sliding contact with them. In this process of making sliding contact, at least two contact pins among the contact pins 317, 327 are always in sliding contact with the multiple-contact slip rings 311a, 318a having the longer arc length among the two assemblages of the segmented slip rings 311, 318. These contact pins 311a, 318a function as the multiple-contact contact pins for the multiple-contact signal circuit Sw.

Thus, even when the coil spring is compressed due to the vibration of the car body 326 or others and a momentary disconnection between any one of the segmented slip rings 311, 318 and the contact pins 317, 327 arises, in the multiple-contact signal circuit Sw, a number of multiple-contact contact pins 317a, 327a are always in sliding contact with the multiple-contact slip rings 311a, 318a. Because of this, there is no simultaneous disconnection of all the contact pins from the multiple-contact slip rings 311a, 318a. Thus, the steering wheel of the present embodiment exhibits a highly efficient relay mechanism.

The present embodiment can also be modified as in the following examples.

Figure 29:
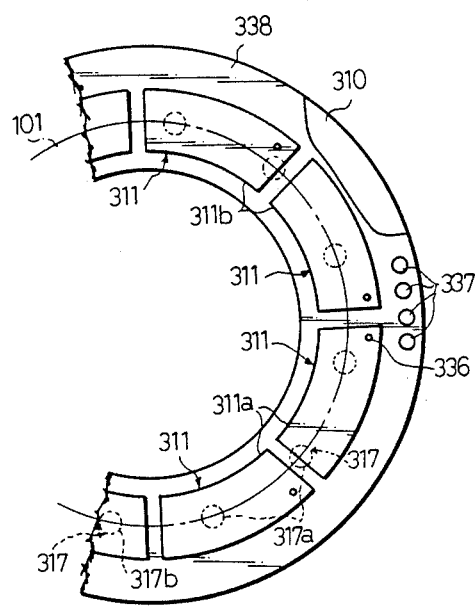
FIG. 29 is a partial plan view showing a modification of the fourth embodiment.

(1) As shown in FIG. 29, as in the embodiment mentioned above, a number of adjacent contact pins 317a among the contact pins 317, 327 are used in the multiple-contact signal circuit Sw as part of the multiple-contact relay mechanism. But, as opposed to the embodiment mentioned above, without using a slip ring having a longer arc length, two adjacent slip rings among the segmented slip rings 311, 318, and having an equal arc length as them, can be used as multiple-contact slip rings 311a, 318a for the specific electrical device 333a and the specific switch 303a. In this modification, the connections between the segmented slip rings 311, 318 and the signal lines 321, 322 are wired OR connections.

(2) The present embodiment can also be applied to the case where a plurality of signal circuit are assembled in a steering wheel having a rotatable pad portion.

(3) Aside from the slip rings arranged along the circular sliding contact line 101, the present embodiment can also be applied using multiple slip rings arranged in the form of multiple concentric circles.

Figure 30:
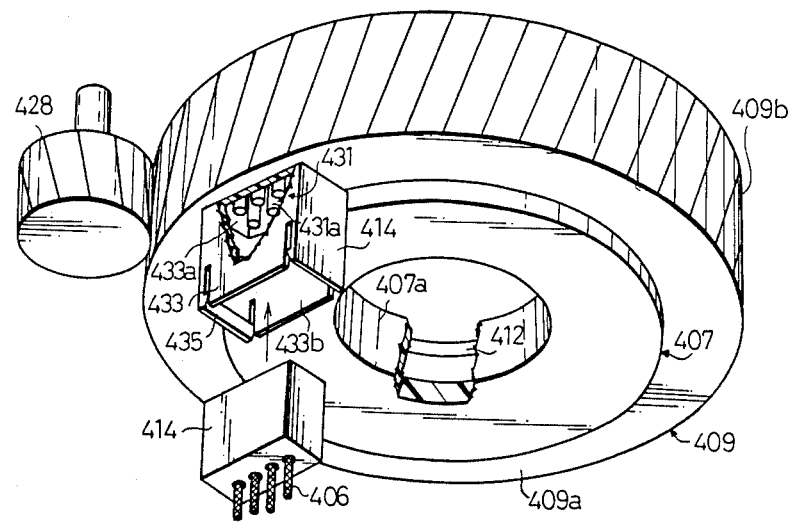
FIG. 30 to FIG. 32 show a fifth embodiment.

Next, the fifth embodiment of the present invention is described with reference to FIG. 30 to FIG. 32. The present embodiment differs from the first embodiment mainly in the structure of the connector area.

A bearing plate 407 made of synthetic resin such as polyamide resin, polyacetal resin, and others, is attached to the boss portion 2 concentric to its outer circumference, with a bearing (not shown) in between.

On the upper surface of the bearing plate 407, a wheel portion 409a of a column sun gear 409 made of synthetic resin is fixed to the bearing plate 407 by fitting it to a collar 407a. A rim portion 409b meshes with a planetary gear 428.

A connector receiving piece 433 in the shape of a rectangular tube is integrally formed with the wheel portion 409a, near the lower circumferential edge of the wheel portion 409a. A connector 414 of column signal lines 406 extending from the column portion is adapted to be inserted into the connector receiving piece 433.

An internal opening 433a adapted to receiving the connector 414 is formed on the wheel portion 409a, on the area where the connector receiving piece 433 is to be formed. Pins 431a, provided on a column insulated base 412, to be described later, jut out from the opening 433a.

Locking claws 435 are formed on an external opening 433b of the connector receiving piece 433 so that the connector 414 does not easily slip off once the connector 414 is inserted into the connector receiving piece 433.

Figure 31:
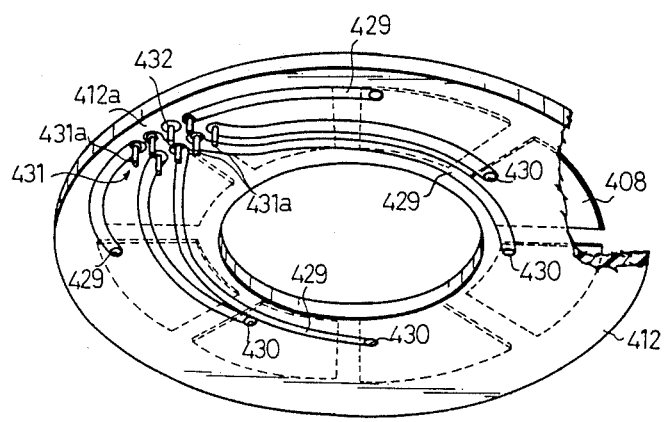

As shown in FIG. 31, the column insulated base 412 having the shape of a flat doughnut is fitted to the collar 407a on the upper surface of the wheel portion 409a. Eight fan-shaped segmented slip rings 408 are disposed at fixed intervals in the shape of a ring, on the upper surface of the column insulated base 412. Wiring patterns 429 are formed in bands on the lower surface of the column insulated base 412. One end of each of these wiring patterns 429 is electrically connected to the column segmented slip ring 408 by means of the slip ring through holes 430. The other ends of the wiring patterns 429 are concentrated at a pin mounting portion 412a provided near the outer portion of the column insulated base 412, and are each connected to a pattern through hole 432. The slip rings through holes 430 situated on the pin mounting portion 412a are also used as pattern through holes 432.

Figure 32:
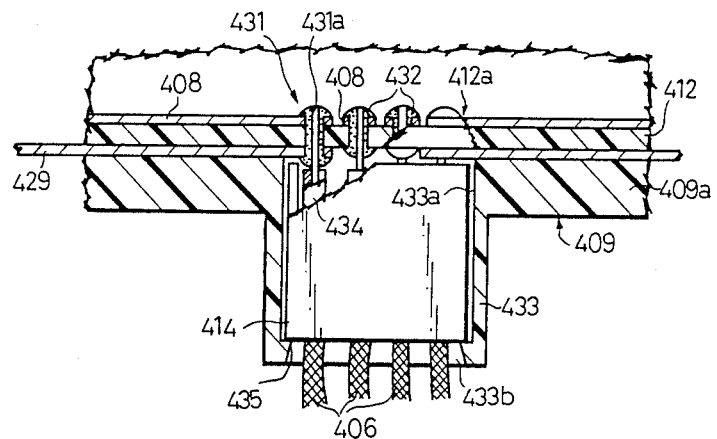

As shown in FIG. 32, the pins 431a, serving as wire connecting pieces 431, are mounted by soldering or others on the pattern through holes 432. When the connector 414 is inserted into the connector receiving piece 433, these pins 431a are inserted into pin insertion portions 434 of the connector 414.

The structure of the pad sun gear area is exactly the same as that of the sun gear of the column portion.

Next, the operation of the present embodiment is described in detail, and its effects are mentioned. The column and pad insulated bases 412, furnished with the column and pad sun gears 409 and column and pad segmented slip rings 408, are fitted to the collars 407a of the bearing plates 407. The pins 431a provided in each of the insulated bases 412 are made to jut out into the inner opening 433a, inside the connector receiving piece 433.

Afterwards, the contact pin unit 11, the two sun gears 409, and the planetary gear 428 are mounted on the boss portion 2, completing the planetary gear mechanism. Then, the connectors 414 of the column and pad signal lines 406 are inserted into the connector receiving pieces 433 on the column and pad sun gears 409.

Upon insertion of the pins 431a in the column and pad insulated bases 412 into the pin insertion portions 434 of the connectors 414, the connectors 414 become locked with the locking claws 435. The connector 414 stays in place inside the connector receiving piece 433 as long as the locking claws 435 are not unlocked.

Further, just by inserting the connector 414 into the connector receiving piece 433, the column and pad segmented slip rings 408 become electrically connected to the column and pad segmented slip rings 408 by means of the wiring patterns 429, the pattern through holes 432, the pins 431a and the connector 414.

As described above, in the present embodiment, since the column and pad signal lines 406 can be electrically connected to the column and pad segmented slip rings 408 after the planetary gear mechanism has been assembled, the efficiency of assembling the planetary gear mechanism is improved.

The present embodiment can also be concretized in the following modifications.

Figure 33:
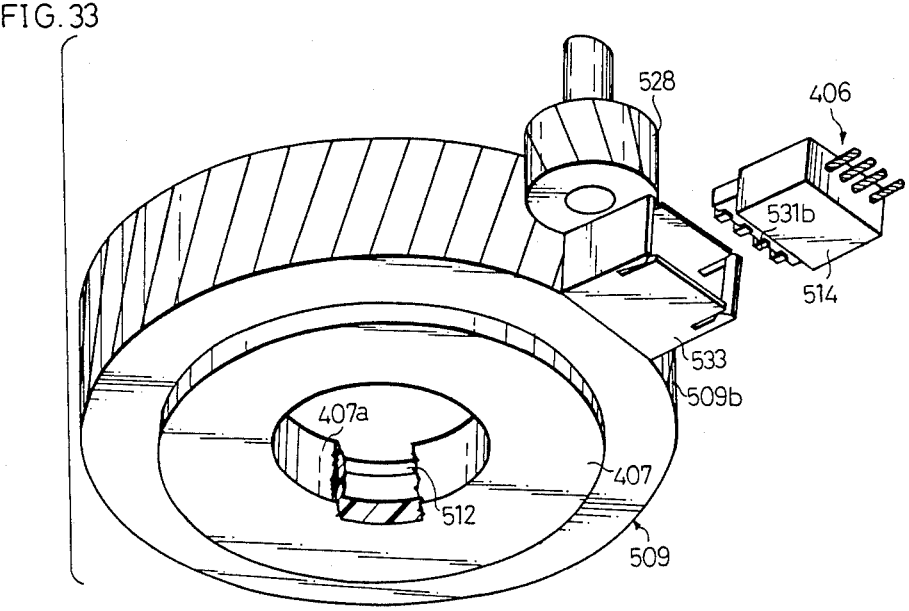
FIG. 33 is an exploded perspective view showing a modification of the fifth embodiment.
Figure 34:
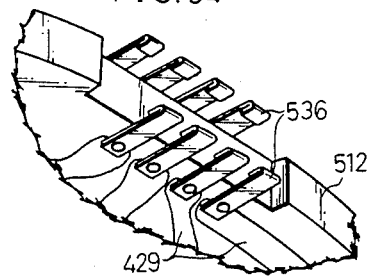
FIG. 34 is a partial perspective view showing contact elements.

(1) As shown in FIG. 33 and FIG. 34, the connector receiving pieces 533 can be mounted on the rim portions 509b of the column and pad sun gears 509. In this modification, the connector receiving piece 533 must be of a size which does not interfer with the rotation and revolution of the planetary gear 528, and must be on a location where it does not interfere with the rotation and revolution of the planetary gear 528. Further, since the pins used as wire connecting pieces cannot be provided on the outer circumference of the column and pad insulated bases 512, connecting elements 536 mutually facing each other are fixed to the upper and lower surfaces of the column and pad insulated bases 512, as shown in FIG. 34. Connecting elements 531b adapted to be connected with the connecting elements 536 are provided in the connector 514 that is inserted into the connector receiving piece 533.

(2) Multiple slip rings disposed in concentric circles on the column and pad insulated bases 412, 512 can also be used instead of the column and pad segmented slip rings 408 of the present embodiment.

(3) The column and pad sun gears 409, 509 can also be directly attached to the boss portion 2 without using the bearing plate 407.

(4) The wire connecting pieces 431 can be made into pin insertion portions, and the pins can be provided in the connector 414.

(5) To prevent entanglement of the wires, it is desirable that the connector 414 and the connector receiving piece 433 have configurations such that they fit only at one point in the direction of rotation.

Figures 35, 36, 37:
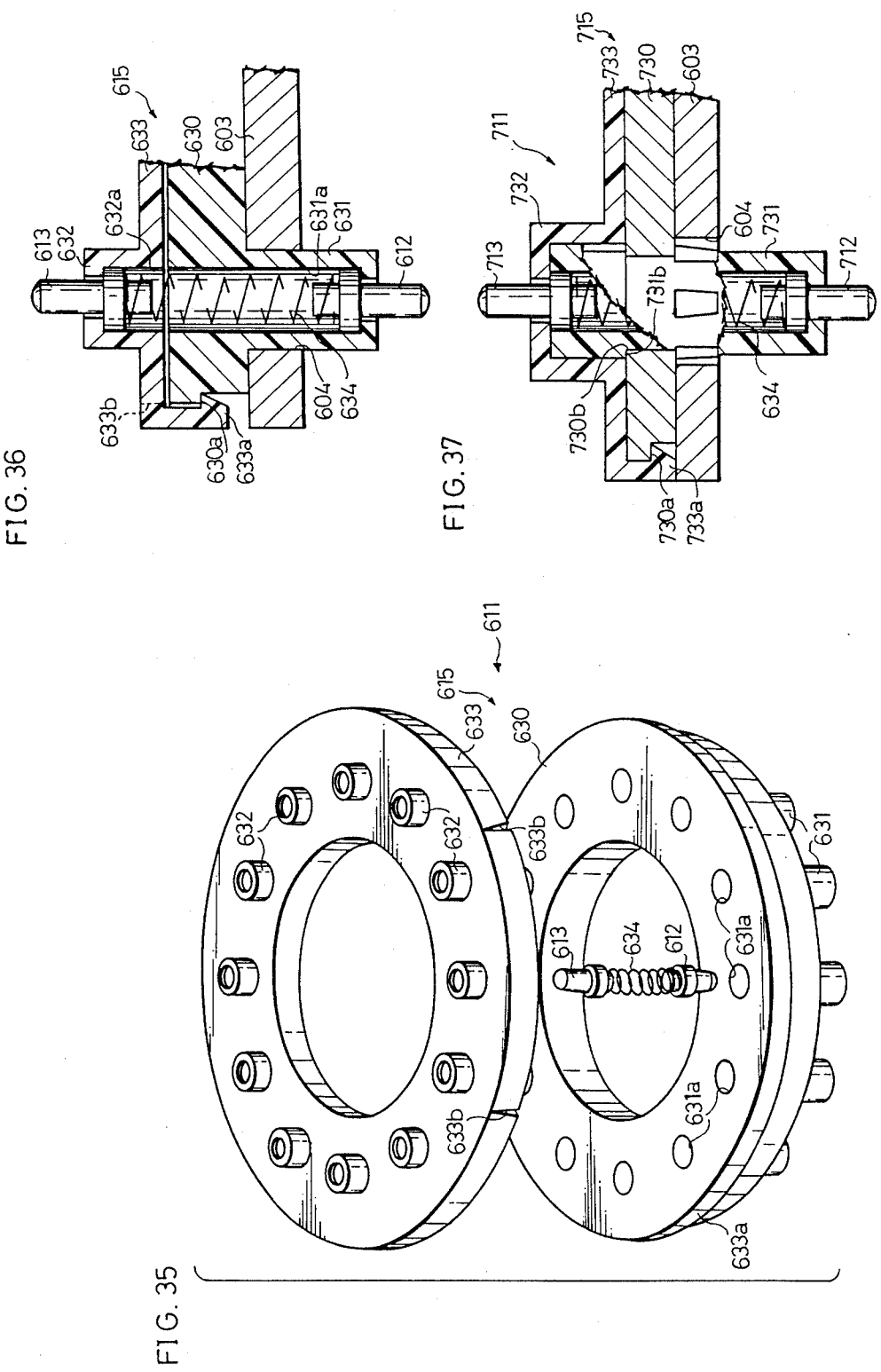
FIG. 35 and FIG. 36 show a sixth embodiment.
FIG. 37 is a partial sectional view showing a modification of the sixth embodiment.
Figure 39:
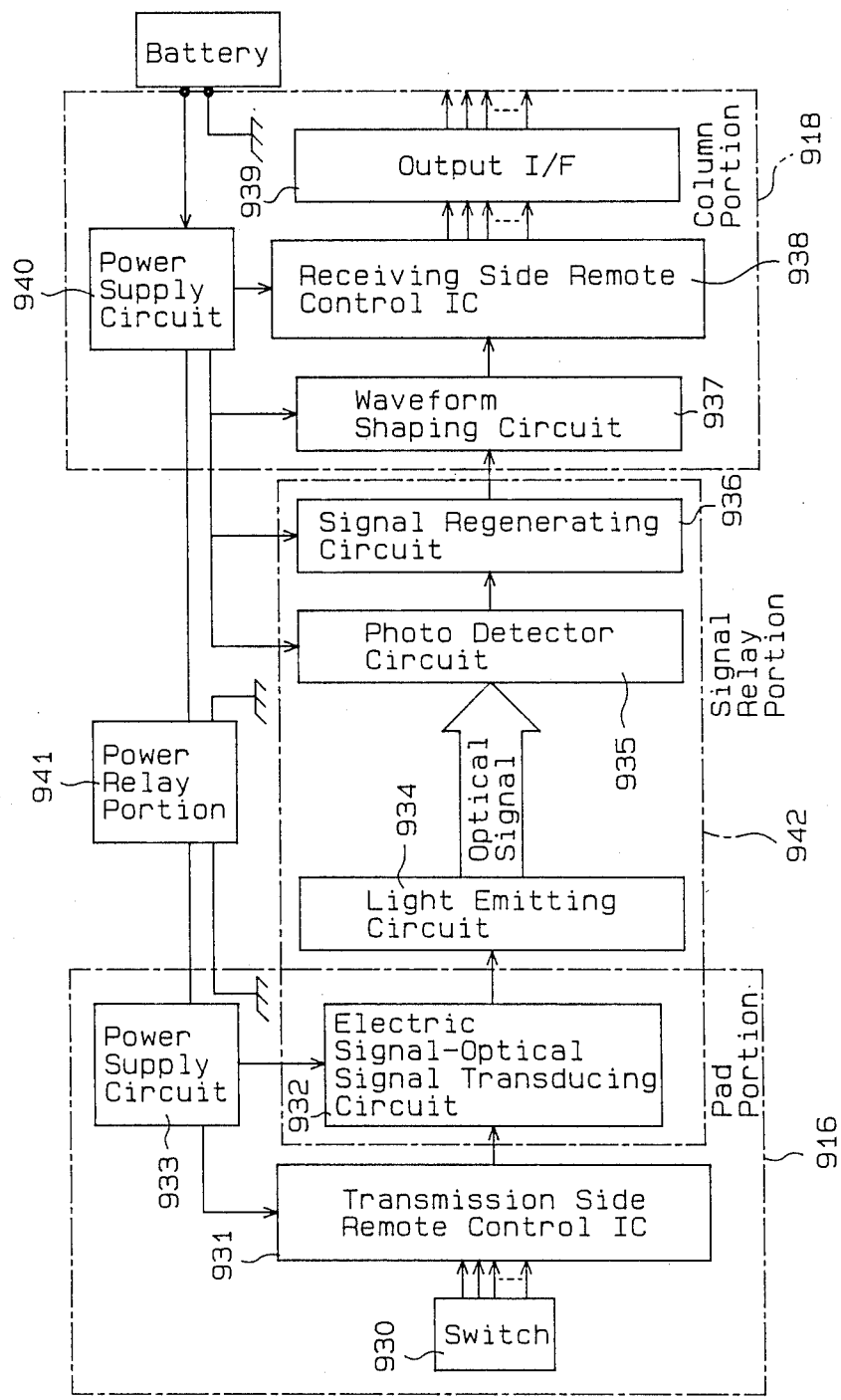
FIG. 39 is a circuit diagram showing a relay mechanism of a related art.

Next, a sixth embodiment of the present invention is described with reference to FIG. 35 and FIG. 36. The present embodiment differs from the first embodiment in the structure of the contact pin unit.

A contact pin mounting piece 615 is provided on the upper surface of a boss plate 603, comprising a lower body 630 having the shape of a flat doughnut and provided with twelve lower contact pin holders 631 protruding at equal intervals along the circular direction, and an upper body 633 also having the shape of a flat doughnut and provided with the upper contact pin holders 632 protruding at locations corresponding to those of the lower contact pin holders 631. Both bodies 630, 633 are made of synthetic resin. Both bodies 630, 633 are provided with insertion holes 631a, 632a at locations corresponding to those of the upper and lower contact pin holders 631, 632.

A flange-shaped undercut portion 630a is formed along the entire outer circumference of the lowerbody 630. A locking portion 633a that locks with the undercut portion 630a is formed along the entire outer circumference of the upper body 633. The two bodies 630, 633 are connected by means of the locking portion 633a and the undercut portion 630a, such that their respective pin insertion holes 631a, 632a make continuous holes. A plurality of gaps 633b are formed along the outer circumference of the upper body 633 so that, when needed, the upper body 633 can be disconnected from the lower body 630.

A pair of pad and column contact pins 612, 613 with a coil spring 634 between them is inserted into each of the pin insertion holes 631a, 632a of the upper and lower bodies 630, 633. The tips of the pad and column contact pins 612, 613 protrude from the upper and lower contact pin holders 631, 632, and are situated on the same respective planes.

The contact pin mounting piece 615, pad and column contact pins 612, 613 and the coil springs 634 make up a contact pin unit 611. The lower contact pin holders 631 on the lower body 630 are inserted into locking holes 604 on the boss plate 603; thus, the contact pin unit 611 rotates with the boss plate 603 during the steering operation.

The assembly and operation of the contact pin unit 611 of the present embodiment is described, and its effects are mentioned.

First, the pairs of pad and column contact pins 612, 613 connected by the coil springs 634 are inserted into the pin insertion holes 631a of the lower body 630, letting the tips of the column contact pins 612 protrude from the lower contact pin holders 631. Next, the upper body 633 is laid on top of the lower body 630, and, while letting the tips of the pad contact pins 613 protrude from the upper contact pin holders 632, the locking portion 633a is made to lock with the undercut portion 630a, thus completing the contact pin unit 611.

Then, the lower contact pin holders 631 are inserted into the locking holes 604 on the boss plate 603, and fixed to the boss plate 603 by means of thermal caulking or other methods. The contact pin unit 611 then becomes locked to the boss plate 603 by means of the lower contact pin holders 631.

The lower contact pin holders 631 are formed integrally with the lower body 631, the upper contact pin holders 632 with the upper body 633. Also, both bodies 630, 633 are connected entirely along their circumferences by means of the undercut portion 630a and locking portion 633a. Thus, curving or warping of the lower body 630 and the upper body 633 near the contact pin holders 631, 632 due to the force of the coil springs 634 is prevented. As a result, the tips of the column contact pins 612 and pad contact pins 613 maintain their locations in their respective planes.

In the present embodiment, the assembly of the contact pin unit 611 is very simple, and the tips of the column contact pins 612 and pad contact pins 613 can be arranged accurately at fixed locations, that is, on the same respective planes. Thus, the friction of sliding contact of the column contact pins 612 and pad contact pins 613 against the column segmented slip ring 9 and pad segmented slip ring 18 becomes uniform, decreasing the wear of both, and making an improvement in the relay efficiency possible.

A modification of the sixth embodiment is described with reference to FIG. 37.

In a contact pin unit 711 of this modification, a lower body 730 is made of aluminum plate. Contact pin holders 731 that carry column and pad contact pins 712, 713 are made of synthetic resin, and are formed as units separate from the lower body 730. Holder insertion holes 730b are perforated on the lower body 730 at the positions where the column contact pins 712 and the pad contact pins 713 are to be disposed. A contact pin holder 731 is attached to the holder insertion hole 730b by locking a locking portion 731b formed around the center of its outer circumferential frame, with the inner circumferential edge of the insertion hole 730b.

The upper body 733, having the locking portion 733a that locks with the undercut portion 730a of the lower body 730, and a cover 732 that covers the contact pin holders 731 protruding from the lower body, is connected to the lower body 730 in the same way as in the sixth embodiment. The column and pad contact pins 712, 713 are inserted into the contact pin holders 731 from the side where the cover 732 is to be attached, and are prevented from coming off the contact pin holders 731 by the cover 732.

In this modification, since the lower body 730 is made of aluminum plate, even if the upper body 733, which is made of synthetic resin, is deformed in the direction of its thickness due to various causes, the lower body 730 will rectify any deformation of the upper body 733 since both bodies 730, 733 are assembled as one unit. Thus, compared to the case where the contact pin mounting piece 715 is composed of an upper and lower body made of synthetic resin, as a whole, the possibility of deformation is small. Because of this, it is more reliable in that the tips of the column contact pins 712 and pad contact pins 713 are positioned accurately on the same respective planes.

The sixth embodiment can be further modified as follows.

Figure 38:
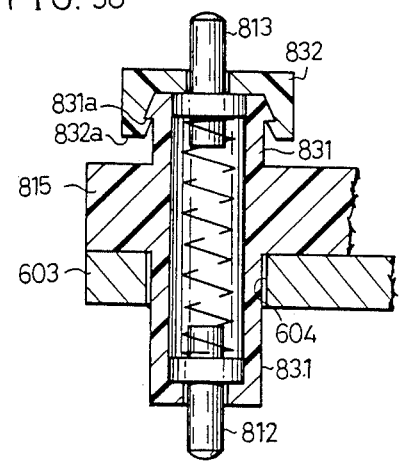
FIG. 38 is a partial sectional view showing another modification.

(1) As shown in FIG. 38, the upper tip of a contact pin holder 831, proturding upward from the upper surface of the contact pin mounting piece 815, is open so that the contact pins 812, 813 can be inserted from the same tip. An undercut portion 831a is formed around the outer circumference of the upper tip of the contact pin holder 831. A cover 832 made of an insulating material such as synthetic resin, rubber, and others, covers the contact pin holder 831, with its locking portion 832a locking with the undercut portion 831a. In addition to the effects of the sixth embodiment, in this modification, even if the contact pin mounting piece 815 is redesigned, for example, there is a change in the number of contact pin holders 831, the covers 832 can still be used as they are.

(2) The configuration of the contact pin mounting piece can be modified in various ways as long as it has the contact pin holders, and the tips of the pad and cloumn contact pins can be positioned on the same respective planes.

(3) The undercut portion or the locking portion can be provided not only around the outer circumference of the contact pin mounting piece but also around the inner circumference or around both inner and outer circumferences.

Inasmuch as it is clear that the present invention can be constructed and applied in a wide range of realizations without departing from its spirit and scope, the embodiments of the present invention are not limited to those specified in the appended claims.

What is claimed is:

1. A steering wheel comprising:
   (a) a column;
   (b) a steering shaft rotatably supported in said column;
   (c) a boss plate attached to said steering shaft;
   (d) a steering ring supported by at least one spoke on said boss plate;
   (e) first and second sun gears disposed axially, one on each side of said boss plate, respectively, said second sun gear being fixed to said stationary column;
   (f) a pad attached to said first sun gear remotely from said boss plate and supporting at least one switch for controlling electrical devices provided in a car body;
   (g) at least one planet gear shaft rotatably supported on said boss plate;
   (h) at least a pair of first and second planet gears mounted on ends of said planet gear shaft and held in mesh with said first and second sun gears, respectively, whereby said pad can be kept stationary during rotation of said steering ring and shaft;
   (i) a contact pin mounting piece attached on a side of said boss plate between said first and second sun gears;
   (j) first and second insulated bases provided axially one on each of facing sides of said first and second sun gears, each of said first and second insulated bases having a surface facing said boss plate;
   (k) a plurality of first segmented slip rings having surfaces and disposed separately along a first circular line on said surface of said first insulated base so as to be mutually insulated, each of said first segmented slip rings being electrically connected to one of said switches;
   (l) a plurality of second segmented slip rings having surfaces and disposed separately along a second circular line on said surface of said second insulated base so as to be mutually insulated, each of said second segmented slip rings facing each of said first segmented slip rings and electrically connected to one of said electrical devices;
   (m) a plurality of pairs of contact pins mounted on said contact pin mounting piece, said each pair having one contact pin disposed to face and make sliding contact with said surfaces of said first segmented slip rings along said first circular line and the other contact pin disposed to face and make sliding contact with said second segmented slip rings along said second circular line; and
   (n) a plurality of interposing means disposed between adjacent pairs of said first segmented slip rings on said first insulated base and between adjacent pairs of said second segmented slip rings on said second insulated base, said interposing means permitting smooth movement of said contact pins between said adjacent pairs of first segmented slip rings and between said adjacent pairs of second segmented slip rings.

2. A steering wheel, as set forth in claim 1, in which each of said surfaces of said segmented slip rings corresponding to said circular line is made flush with said surface of said insulated base corresponding to said circular line, and said interposing means comprising said surface of said insulated base corresponding to said circular line.

3. A steering wheel, as set forth in claim 1, in which said interposing means includes at least one dummy contact point provided between said segmented slip rings and having a surface located on a same plane as said surface of said segmented slip ring, and insulated grooves separating said dummy contact point from said segmented slip rings.

4. A steering wheel, as set forth in claim 3, in which each said dummy contact point has a plurality of segments and insulated grooves electrically isolating said segments on said insulated base.

5. A steering wheel, as set forth in claim 4, in which said segmented slip rings and said dummy contact point are formed simulataneously of a same metal by means of a plating process.

6. A steering wheel, as set forth in claim 1, in which said interposing means comprises a guiding means disposed along said circular line and spanning said two adjacent segmented slip rings, said guiding means including a pair of inclined portions at both ends of its length, each of said inclined portions having a surface extending continuously from said surface of said segmented slip ring, such that when said contact pins move between said segmented slip rings, said contact pins can move across said segmented slip rings along said inclined portions without making contact with an edge of said segmented slip ring on said circular line.

7. A steering wheel, as set forth in claim 6, in which said guiding means comprises a pair of guiding pieces disposed parallel to each other on both sides of said circular line, said guiding pieces being formed such that an interval between ends of lengths of both said guiding pieces is greater than a diameter of said contact pin, and an interval between central portions of said lengths of both said guiding pieces is smaller than said diameter of said contact pin.

8. A steering wheel, as set forth in claim 7, in which said surface of said segmented slip rings is on a same plane as said surface of said insulated base.

9. A steering wheel, as set forth in claim 6, in which said guiding means comprises a pair of guiding pieces disposed on both sides of said circular line parallel to each other at an interval smaller than a diameter of said contact pin, and said surface of said segmented slip ring is on a same plane as said surface of said insulated base.

10. A steering wheel comprising:
(a) a column;
(b) a steering shaft rotatably supported in said column;
(c) a boss plate attached to said steering shaft;
(d) a steering ring supported by at least one spoke on said boss plate;
(e) first and second sun gears disposed axially one on each side of said boss plate, respectively, said second sun gear being fixed to said stationary column;
(f) a pad attached to said first sun gear remotely from said boss plate and supporting switches for controlling electrical devices provided in a car body;
(g) at least one planet gear shaft rotatably supported on said boss plate;
(h) at least first and second planet gears mounted on ends of said planet gear shaft and held in mesh with said first and second sun gears, respectively, whereby said pad can be kept stationary during rotation of said steering ring and shaft;
(i) a contact pin mounting piece attached on a side of said boss plate between said first and second sun gears;
(j) first and second insulated bases provided axially one on each of facing sides of said first and second sun gears, each of said first and second insulated bases having a surface facing said boss plate;
(k) relaying means, provided between and electrically connecting said switches and said electrical devices, including
a plurality of first segmented slip rings having surfaces and disposed separately along a first circular line on said surface of said first insulated base so as to be mutually insulated, each of said first segmented slip rings being electrically connected to one of said switches, said first segmented slip rings having at least one specific slip ring;
a plurality of second segmented slip rings having surfaces and disposed separately along a second circular line on said surface of said second insulated base so as to be mutually insulated, each of said second segmented slip rings facing each of said first segmented slip rings and being electrically connected to one of said electrical devices, said second segmented slip rings having at least one specific slip ring facing said specific slip ring of said first segmented slip rings;
a plurality of pairs of contact pins mounted on said contact pin mounting piece, said each pair having one contact pin disposed to face and make sliding contact with said surfaces of said first segmented slip rings along said first circular line and the other contact pin disposed to face and make sliding contact with said second segmented slip rings along said second circular line, at least two pairs of said contact pins making simultaneous contact with said specific slip rings.

11. A steering wheel, as set forth in claim 10, in which said specific slip ring is composed of one of said segmented slip rings which has a length in the direction of said circular line approximately twice that of the remaining said segmented slip rings.

12. A steering wheel, as set forth in claim 10, in which each of said segmented slip rings has an equal length in the direction of said circular line, and said specific slip ring is composed of two adjacent segmented slip rings.

* * * * *